May 21, 1929.  H. H. BOYCE  1,713,518
INDICATING INSTRUMENT
Filed Feb. 3, 1926   3 Sheets-Sheet 1
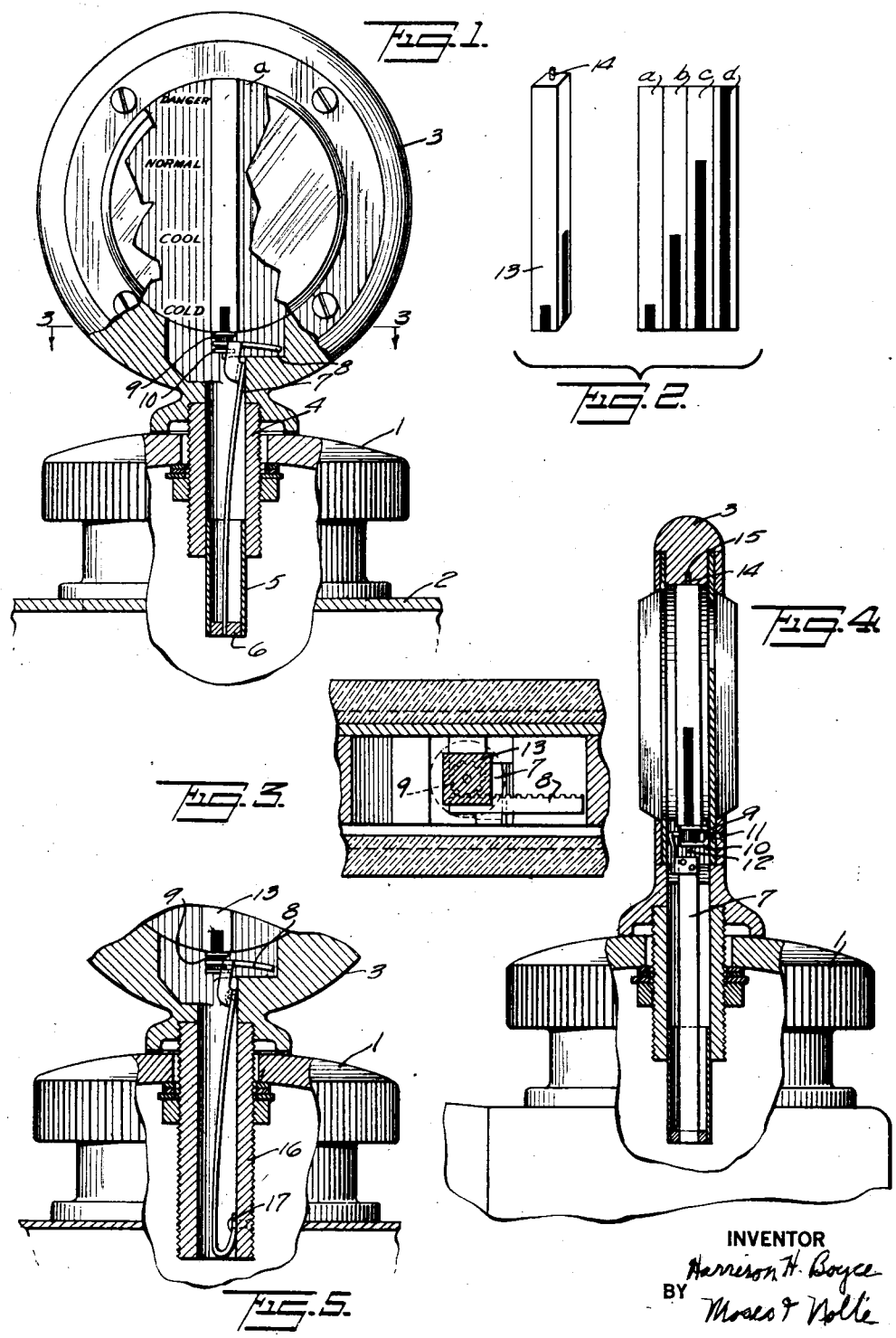
INVENTOR
Harrison H. Boyce
BY Moses & Nolte
ATTORNEY

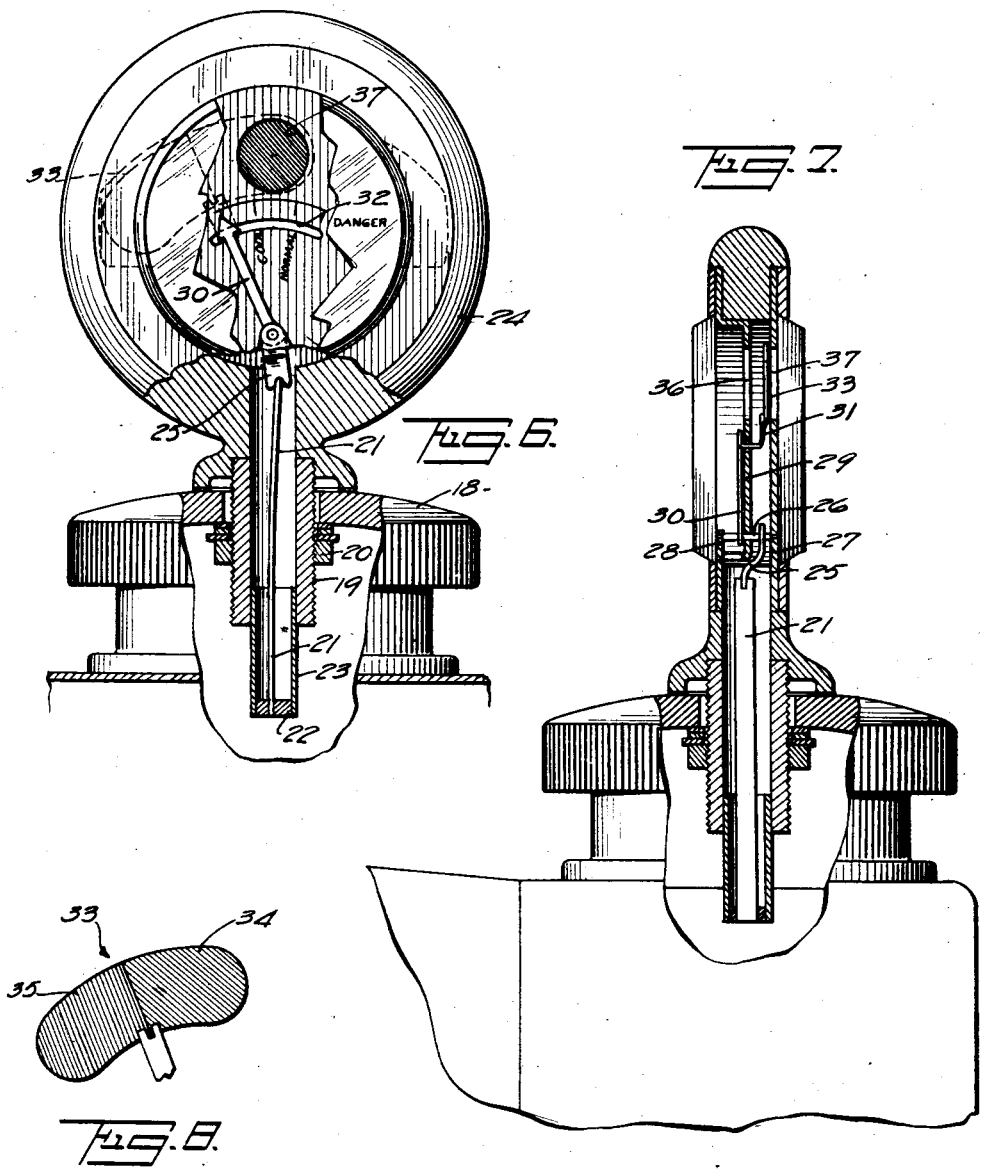

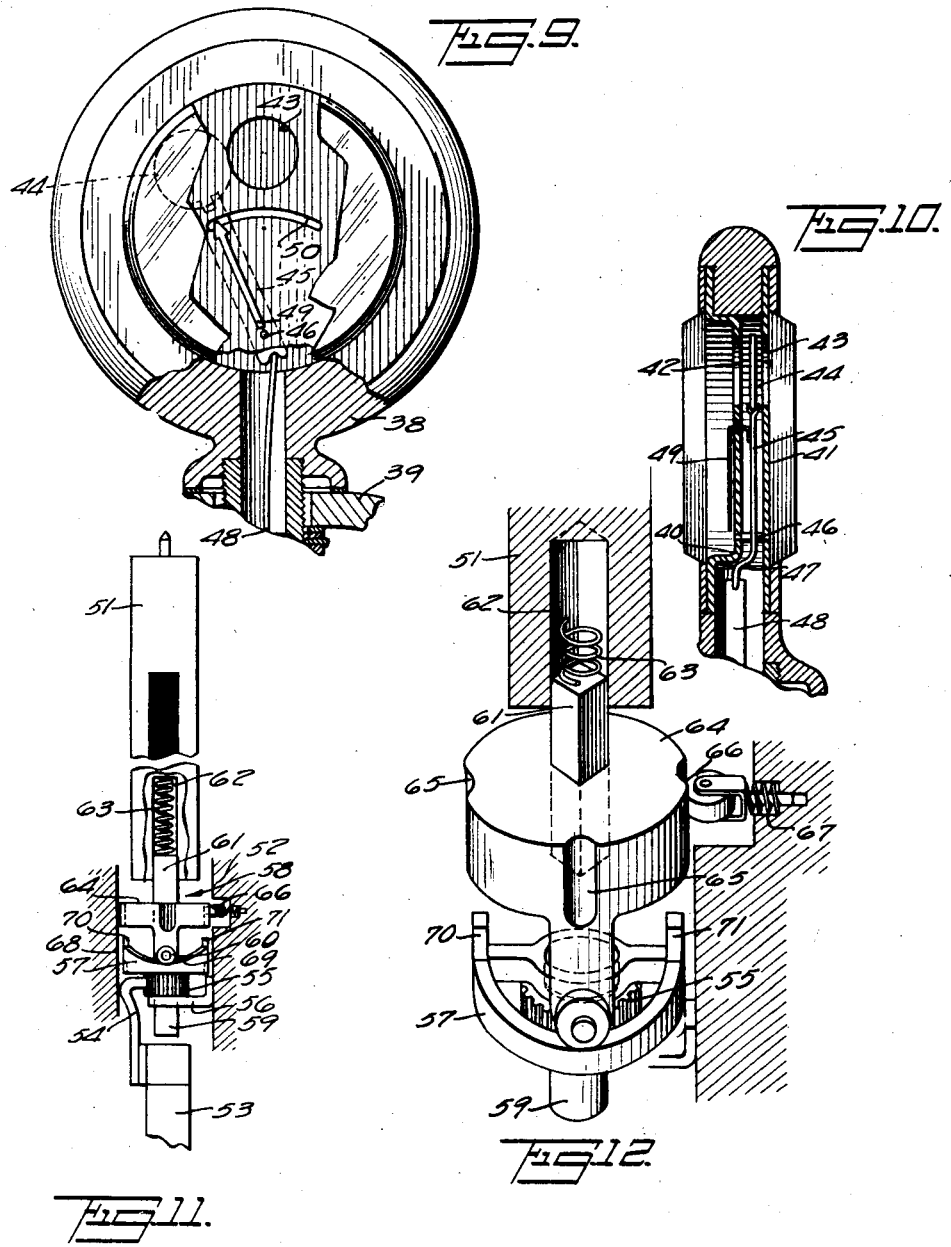

Patented May 21, 1929.

1,713,518

UNITED STATES PATENT OFFICE.

HARRISON H. BOYCE, OF JERICHO, NEW YORK.

INDICATING INSTRUMENT.

Application filed February 3, 1926. Serial No. 85,699.

This invention relates to indicating instruments, being embodied in the illustrative form, in an instrument designed to be mounted on the radiator of an automobile for indicating in a general way the conditions in the cooling system and for warning the operator of danger.

In an instrument of this class it is not important to keep the operator advised of the exact operating temperature in degrees, but it is desirable that he be informed roughly what the state of the motor is and that he be unfailingly warned of a dangerous operating condition. It is an object of the present invention to provide an indicating instrument of this kind in which the changes in operating conditions will be indicated, not by a progressive movement of the indicating means, but by a succession of distinctly differentiated indications which differ sufficiently from one another to command attention.

It is a further object of the invention to provide in an instrument of this kind an indicating means which is conspicuous and easily readable by night or day, and in which additional concurrently operating indicating means is provided to teach the driver the significance of the different positions or indications of the more conspicuous indicating means.

Other objects and advantages will hereinafter appear.

In the drawings:

Figure 1 is an elevation, partly in section, of an indicating instrument embodying features of the present invention, mounted on the cap of an automobile radiator;

Figure 2 is a perspective view of the indicating member of the instrument with a developed view showing the several faces of the indicating member side by side;

Figure 3 is a fragmentary, horizontal section on the line 3—3 of Figure 1;

Figure 4 is a side elevation, partly broken away, showing the instrument in vertical section;

Figure 5 is a fragmentary elevation, partly in section, showing a somewhat different form of temperature responsive means from that disclosed in Figures 1 to 4;

Figure 6 is an elevation, partly in section, embodying a different form of the indicator means from that of the preceding figures;

Figure 7 is a side elevation, partly in section, of the instrument shown in Figure 6;

Figure 8 is a detail view of an indicator screen or target employed in the construction of Figures 6 and 7;

Figures 9 and 10 are front and side elevations respectively, each being partly in section, of a modified embodiment generally similar to Figures 6 and 7;

Figure 11 is a detail view of a portion of an instrument generally similar to that of Figures 1 and 2, but embodying mechanism whereby the indicator member is caused to move in steps, each step bringing a face of the indicating member squarely into view; and Figure 12 is an enlarged detail view of the mechanism whereby this step by step movement is obtained.

In the embodiment of the invention disclosed in Figures 1 to 4, inclusive, the instrument is mounted upon the cap 1 of an automobile radiator 2. The instrument comprises a circular frame 3 and a depending stem 4, threaded into the base of said frame. The stem 4 carries an extension 5 having a plug 6 in its lower end in which is mounted a bimetallic strip 7 designed to flex with changes of temperature. This strip 7 is composed of two metal strips secured together, which have different coefficients of expansion and has secured at its upper end a horizontal rack 8 which meshes with a pinion 9 carried between the upper and lower arms of a yoke 10 made fast in the instrument frame by a screw 11. The pinion 9 has driving engagement in any suitable way with a shaft 12 that projects from the lower end of an indicator member 13, said indicator member being rotatively supported at its upper end by a bearing pin 14 which seats in a bearing 15 formed in the instrument frame.

The indicator member is preferably polygonal in form, having sides A, B, C and D, which are provided with indicator marks of progressively increasing length, as shown in Figure 2. Each face simulates in appearance a thermometer tube having the liquid indicator column standing at a different height therein.

A rise in temperature in the cooling system of the automobile will result in a flexing of the bimetallic strip 7 and this will move the rack 8 toward the left, as viewed in Figure 1. Such movement of the rack will rotate the indicator 13 toward the left, withdrawing face A from the view of the operator and causing faces B, C and D to be exhibited successively in its place. It will thus be seen that rise in temperature is not indicated by a slow and steady progress of the indicating means, as is the case with a liquid column responsive to temperature, but that the difference between the height of the mark on each face of the indicator member and the adjoining faces is so great as to be distinctly noticeable. The operator is thus enabled to distinguish between the four principal stages of operation, as "Cold", "Cool", "Normal", and "Danger", at a glance. Suitable indicia may be provided alongside the indicator to explain the significances of the indications exhibited thereby.

It will be understood that the marks occurring on the faces of the indicator 13 are simply chosen as illustrations of one suitable kind of indicia for notifying the operator of the operating condition of the motor. Such indicia might be replaced, however, by marks of distinctive color or appearance or by words signifying the condition of the motor, as "Cold", "Cool", "Normal", "Danger".

In the form of the invention disclosed in Figure 5, the construction is generally the same as that already described, with the exception that the bimetallic strip is not mounted in a plug at the lower end of the instrument stem 16, but is bent back and secured by a rivet 17 or other suitable means in said stem. With this construction, the bimetallic strip is exposed directly to the action of the air and steam within the radiator, and may, therefore, be more quickly responsive to the changes of temperature therein, particularly when steam, which is indicative of danger, is formed in the radiator.

In the form of the invention shown in Figures 6, 7 and 8, the instrument is mounted on a radiator cap 18 with its stem 19 extending through said cap and secured thereto by a nut 20 threaded on the stem. As in the form of the invention disclosed in Figures 1 to 4, a bimetallic strip 21 is mounted in a plug 22, carried at the lower end of a sleeve 23, forming an extension of the stem 19. This bimetallic strip extends upwardly through the instrument stem and through the lower portion of the frame 24. At its upper end the bimetallic strip fits within the bifurcated lower end of the crank 25 fast on a pivot 26, that is journaled in a back plate 27 and in a lug 28 struck up from a scale or legend bearing plate 29. Between the lug 28 and the main body of the scale plate 29 the pivot pin 26 has fast upon it an indicator pointer 30 which cooperates with a scale on the face of the scale plate indicating the operating conditions of the motor in a general way.

It is a feature of this embodiment of the invention that provision is also made of more conspicuously noticeable means for indicating the operating condition of the the motor, such additional means being especially easy to read at night. To this end an extension 31 of the pointer 30 is extended through a slot 32 of the scale plate and carries an indicating device or target 33 which may preferably consist, as shown, of two pieces of transparent colored material, such as celluloid. The piece 34 may be green to indicate normal operation, and the piece 35 may be red to indicate abnormal operation, although any other suitable colors might be employed, or one of the pieces might be colorless or might be omitted. The scale plate 29 has a target opening 36 and the back plate 27 has an opening 37 in alignment with the opening 36. It will be evident from an inspection of Figure 6 that when the motor is cold, only the indicator piece 34 will be visible at the target opening, but that as the motor warms up the indicator hand will move toward the right, carrying the indicator device with it, so that the indicator piece 35 will gradually displace the piece 34, and finally, when a dangerous condition is reached, will be the sole member visible at the target opening. With this form of construction the target indicator 33 will be large and easy to read, either by day or night, and will be the portion of the indicator instrument on which the operator's eye will naturally fall, and to which he will give attention. The indicator hand 30, cooperating with the scale and wording on the scale plate, will quickly instruct the new operator what significance to attach to the positions of the target indicating means, so that the operator will quickly learn how to judge of the motor operating condition from the target when the light is insufficient to reveal the scale plate and pointer 30.

The embodiment of Figures 9 and 10 is very similar to that of Figures 6 to 8. In this form of the invention, the instrument comprises a frame 38 which is mounted upon the radiator cap 39. A scale plate 40 and back plate 41 have aligned openings 42 and 43 in them across which an indicator disc 44 moves. The disc 44 is carried by a lever 45 mounted on a shaft 46 that is journaled in the scale plate 40 and the back plate 41. The lower end 47 of the lever is bifurcated to embrace the upper end of a bimetallic strip 48 which is mounted in the same manner as the strip 21 of Figures 6 and 7, or in any other suitable manner. The lever 45 carries an indicator hand 49 which extends forward through a slot 50 in the scale plate 40. The indicator hand 49 cooperates with a scale and indicating legend on the face of the scale plate, the operation being the same as that of Figure 6. The indicator disc 44 is moved to and from the target opening 42. This disc may be the transparent or opaque, and in either case will provide an indicator which is easily readable either by day or night, the essential requirement being that it shall present contrasting appearances at the target opening for normal and unsafe operation. Such contrast may be effected either by presenting distinct colors or by cutting off the light passing through the opening. In this respect it is the same in principle as the target mechanism disclosed in my pending application, Serial No. 651,772, filed July 16, 1923, entitled Indicators.

In the form of the invention disclosed in Figures 11 and 12, an indicator member 51, similar in outward appearance and configuration to the indicator member 13 of Figure 2, is employed, and provision is made of means for turning the indicator member in either direction step by step, each step being of such length as to withdraw one of the faces of the indicator 51 from view and present another face squarely to the driver of the vehicle. With this construction the driver never sees an edge of the indicator for more than an instant, so that one of the faces is always squarely in view to give a plainly readable and unmistakable indication.

The instrument comprises a frame 52 which carries the indicator member 51 and mechanism whereby it is operated from a bimetallic strip 53 through a rack 54. A pinion 55, supported upon a bracket 56, has a cam 57 fast upon it. The pinion and cam are driven by the rack in opposite directions, according to whether the vehicle motor is growing warmer or colder. An intermediate driving member 58 comprises a shaft 59 that extends freely through the cam 57, pinion 55, and bracket 56, and forms a journal for the cam and pinion. This driving member 58 carries a roller 60 that rides upon the surface of the cam. The driving member 58 has a square or other non-circular stem 61 that fits into a correspondingly shaped cavity 62 in the indicator member 51. A spring 63 fits in the cavity above the stem, pressing the indicator member 51 upward into bearing engagement with the frame at its upper end and pressing the driving member 58 downward so that it rests, through the roller 60, upon the cam 57. It will be evident that the indicator member can turn only when the driving member 58 turns. The driving member 58 comprises a circular collar 64 having detent notches 65 at ninety degree intervals therein, said notches being provided for cooperation with a detent roller 66 which is urged by a light spring 67 against said collar 64. Ordinarily when the pinion 55 is being rotated by the rack 54 the intermediate driving member 58 will be detained and prevented from rotating by the detent roller 66.

It will be observed that the cam comprises two upwardly inclined surfaces 68 and 69, and that the roller 60 rests in the valley between these surfaces, as seen in Figure 11. Rotation of the cam in either direction from the position shown in Figure 11 will not result in rotation of the driving member 58, but will cause the roller, and hence the driving member 58, to be lifted by the passage of one of these inclined cam surfaces beneath the roller. The surfaces 68 and 69 extend, each, through about ninety degrees, and are terminated abruptly by upstanding projections 70 and 71 respectively. When the pinion has been rotated through about ninety degrees, one of these surfaces 70 or 71, according to the direction of rotation, engages the roller 60, forcing the driving member 58 to turn for a short distance so that the detent roller 66 is forced out of the detent notch 65, in which it is engaged. The intermediate driving member 58 is thus freed from restraint, and under the pressure of the spring 63, the roller 60 is caused to ride down the cam to the valley between the surfaces 68 and 69, thus rotating the indicator member 51 through ninety degrees. As the next succeeding detent notch 65 comes opposite the roller 66 in this operation, it interfits with the roller, arresting the rotation of the indicator member at exactly ninety degrees from its initial position. The cam 57 and the intermediate driving member 58 are thus restored to the relative positions indicated in Figure 11, although each has been rotated through ninety degrees. A further rotation of the pinion through ninety degrees in the same direction will, at the termination of such period, result in a repetition of the action already described. Should the pinion be rotated in the opposite direction, a precisely similar operation will occur at the end of ninety degrees rotation in that direction.

Variations may be resorted to within the scope of the invention and parts of the improvements may be used without others.

What I claim is:

1. In an indicating instrument, a rotary indicating member, said member having indicating marks of varying lengths arranged to be brought selectively into view by rotation of the member, said marks differing in length from one another sufficiently to render each mark distinctive.

2. In an indicating instrument, a polygonal indicating member, adjoining faces of said member having distinctive indicia thereon, and means to rotate said indicating member to bring the faces thereof successively into view.

3. In an indicating instrument, a polygonal indicating member, means for rotating the indicating member to bring the faces thereof successively into view, said faces having marks of progressively increasing length upon them, the mark on each face differing in length from the marks on the adjacent faces by a substantial amount sufficient to render the replacement of one face by another conspicuously noticeable, and legend bearing means located in proximity to the indicator member for explaining the significance of said marks.

4. In an indicating instrument, an indicating member constructed to indicate step by step different selected conditions or stages of operation, said selected stages having progressively different height marks thereon distinguishing substantially from one another and all intervening stages being unindicated except as they are roughly indicated by an indication of one of the adjacent states selected for indication and means to bring the different height marks into visual position.

5. In an instrument for indicating operating conditions of a vehicle motor, in combination, a stem arranged to extend into the cooling system of the motor, a temperature responsive element mounted in said stem, a rotary multi-faced indicator in line with said stem, rotatable about a vertical axis and having a plurality of distinctive indicia on the faces thereof, multiplying operating connections between the temperature responsive element and the indicator adapted to accentuate the movement of the indicator and a resiliently actuated means cooperating with said indicator to cause the indicator to lag behind the temperature responsive element and then to catch up quickly.

6. In an indicating instrument, a continuously operated heat responsive means, a polyfaced indicator having a progressively different length-indicating mark on each face, means normally holding the indicator stationary, and means for operating the indicator from the heat responsive means in opposite directions comprising a spring arranged to be dressed by relative movement of the indicator and the heat responsive means in either direction, and means for releasing the indicator for movement by the spring at predetermined stages.

7. In an indicating instrument, an indicating member constructed to indicate step by step different selected conditions or stages of operation, said selected stages having marks of progressively different size thereon, distinguishing substantially from one another, and all intervening stages being unindicated except roughly by one of the adjacent stages selected for indication, and means for bringing the different marks into visual position.

In testimony whereof I have affixed my signature to this specification.

HARRISON H. BOYCE.